(No Model.)

3 Sheets—Sheet 1.

G. W. THISSELL.
FRUIT GRADER.

No. 431,176.

Patented July 1, 1890.

Witnesses
Geo. H. Strong
G. H. Nurse

Inventor
George W. Thissell
By Dewey & Co.
Attys (No Model.) 3 Sheets—Sheet 2.
G. W. THISSELL.
FRUIT GRADER.
No. 431,176. Patented July 1, 1890.
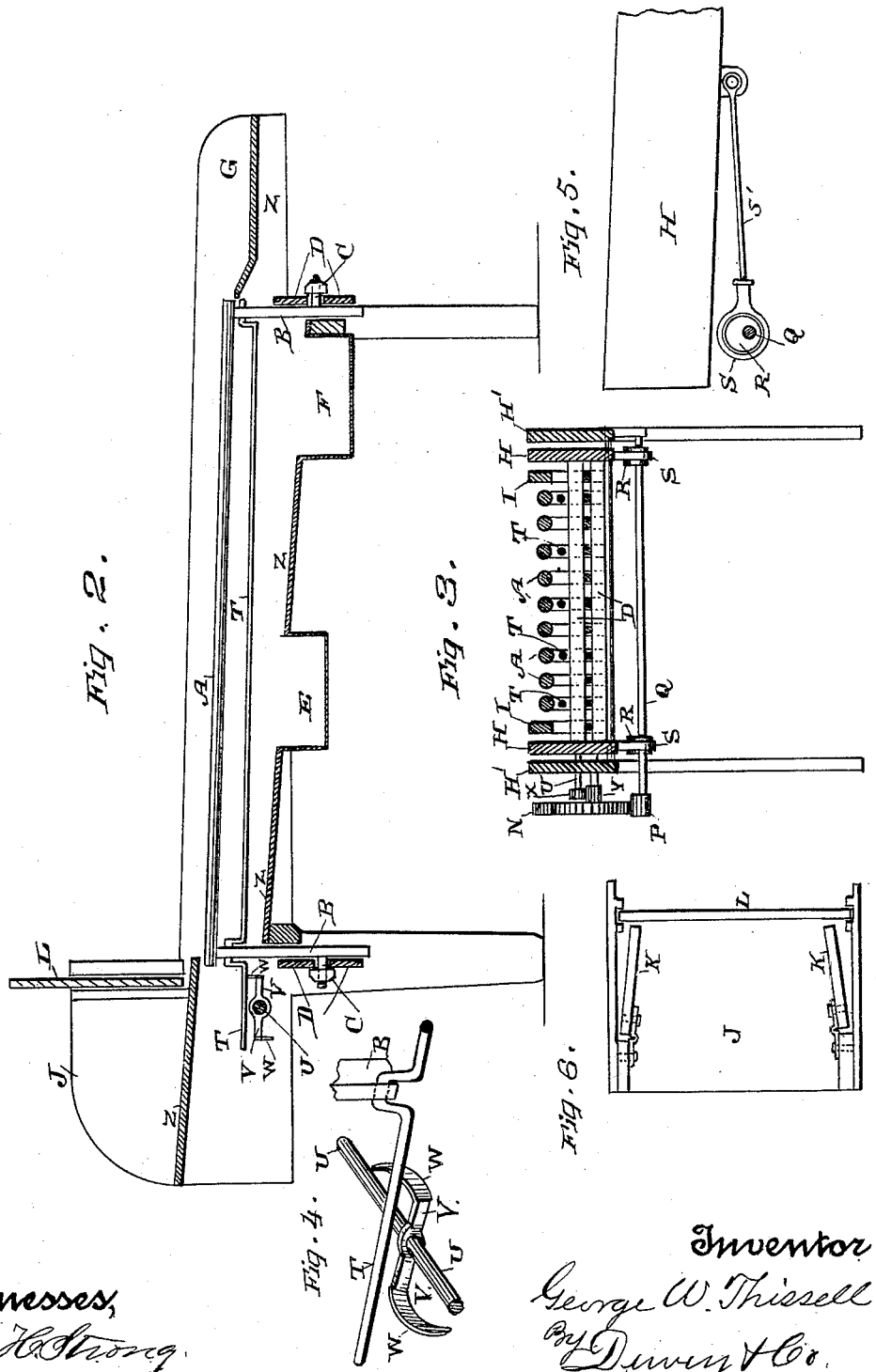

(No Model.) 3 Sheets—Sheet 3.

G. W. THISSELL.
FRUIT GRADER.

No. 431,176. Patented July 1, 1890.

Witnesses,
J. H. Towne
H. C. Lee

Inventor,
George W. Thissell
By Dewey & Co.
Atty

UNITED STATES PATENT OFFICE.

GEORGE W. THISSELL, OF PLEASANT VALLEY, CALIFORNIA.

FRUIT-GRADER.

SPECIFICATION forming part of Letters Patent No. 431,176, dated July 1, 1890.

Application filed August 27, 1889. Serial No. 322,116. (No model.)

*To all whom it may concern:*

Be it known that I, GEORGE W. THISSELL, of Pleasant Valley, Solano county, State of California, have invented an Improvement in Fruit-Graders; and I hereby declare the following to be a full, clear, and exact description of the same.

My invention relates to an apparatus which I call a "fruit-grader;" and it consists in the constructions and combinations of devices which I shall hereinafter fully describe and claim.

Figure 1:
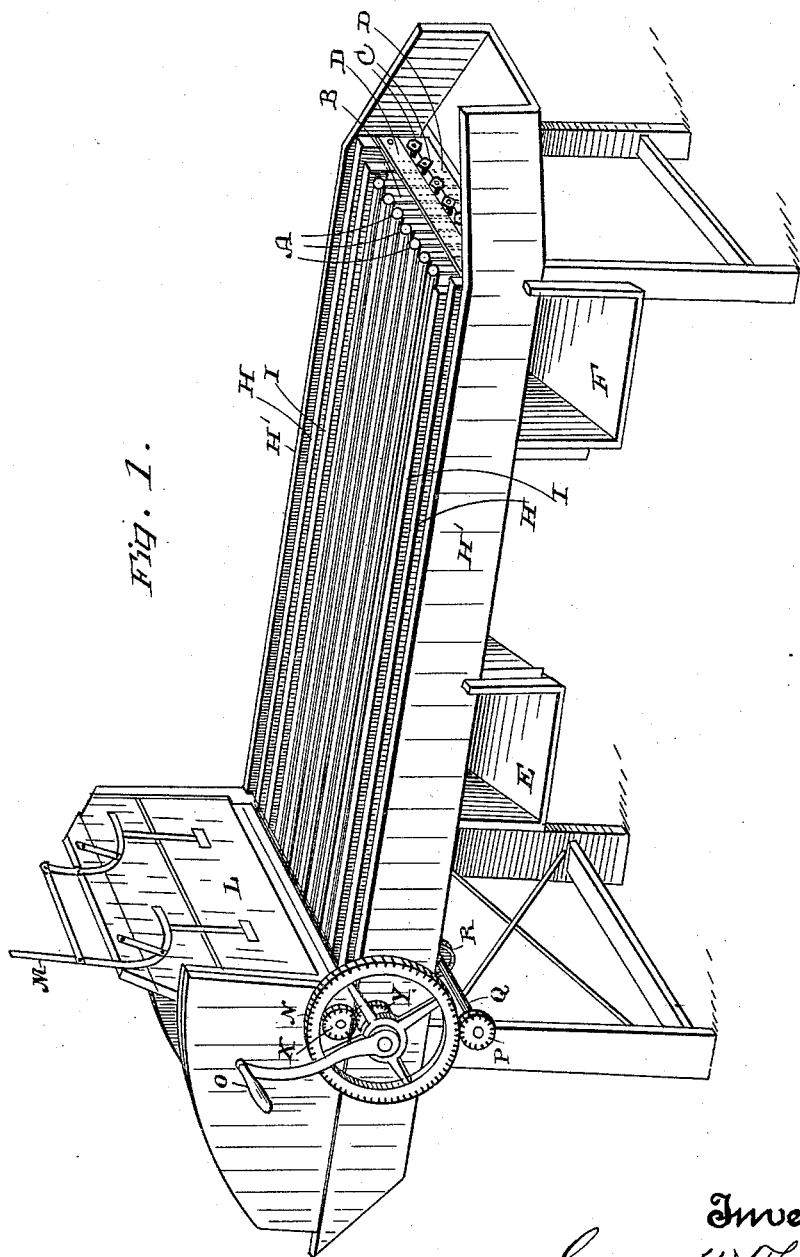
Figure 7:
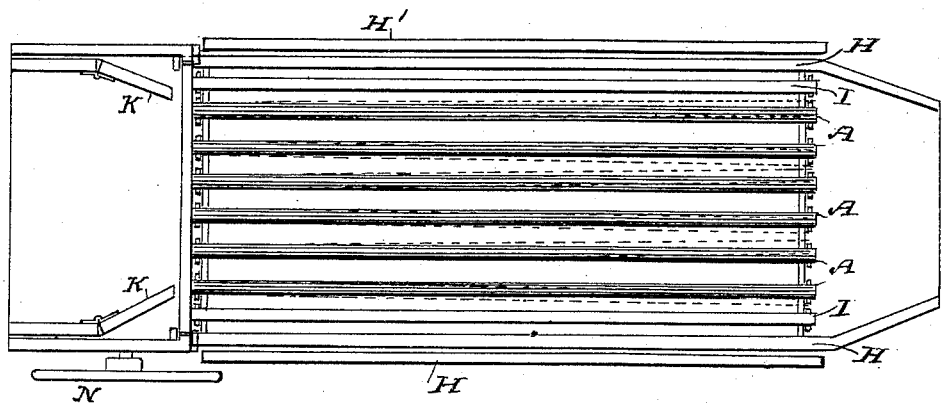

Referring to the accompanying drawings for a more complete explanation of my invention, Figure 1 is a perspective view of my apparatus. Fig. 2 is a vertical longitudinal section. Fig. 3 is a transverse section. Figs. 4, 5, and 6 are details of construction. Fig. 7 is a plan view.

This apparatus is intended to grade fruit—such as prunes, apricots, peaches, &c.—and to deliver it in different sizes into the proper receptacles.

It consists of a series of bars A, which may be of wood or iron, these bars being supported by standards B from the frame-work, so that the bars extend longitudinally in the frame, and may have the spaces between them adjusted so that the bars will stand nearer to or farther from each other, according to the size and class of fruit to be graded. The lower ends of the standards B have adjusting and set screws C passing through slots in the transverse bars D, and by means of these clamping-screws the bars are adjusted so that at the upper ends they will be near enough together to receive and support all the fruit which is delivered upon them at this point. They are made to gradually diverge from this point toward the lower end, so that the smaller fruit will drop between the bars at the upper end into a proper receptacle E, and the next size larger will be delivered into the receptacle F, while the third grade may pass out through the chute G into still another receptacle. If desired, more or less of these grades may be made according to the necessities of the case.

The apparatus is supported in a frame H, which is in turn suspended in an outer stationary frame H', so as to be capable of an end-shaking motion, described hereinafter, and between the sides of this frame are the supplemental sides or bars I, which are movable and adjustable simultaneously with the grading-bars A, so that when the latter are moved nearer together for the purpose of grading small fruit these supplemental sides are also moved up to prevent the fruit from falling between the sides and the bars.

The fruit is first placed in the hopper or receiver J, and from there is delivered upon the upper ends of the bars. Within this receiver are the hinged gates K, which are so arranged as to direct and discharge the fruit between them upon the upper end of the grading-bars.

The discharge of the fruit from the hopper J is regulated or stopped by means of a gate L, which may be opened or closed for the purpose by means of suitable levers and a handle M.

Upon one side of the machine is a gear-wheel N, having a crank O, by which it is turned, and below the gear-wheel is a pinion P, mounted upon a shaft Q, this shaft carrying the eccentrics R. These eccentrics have straps S and rods S', which are connected with the main frame H, and it will be manifest that when the shaft and the eccentrics are rotated they will, through the connections, give an end-shaking motion to the frame H and to the grading-bars which are supported within this frame, and this causes the fruit to roll down, resting upon the bars until it reaches a point where it can fall through.

In order to prevent the fruit from sticking between the bars when it reaches the point where it is nearly ready to fall through, I have shown the crank-arms or swinging rods T, journaled in the uprights or standards B, so as to extend longitudinally beneath the bars A. One of these crank-arms is placed beneath each alternate bar, so that when it is turned up to one side or the other it will be brought beneath the space between the bars on the side to which it is turned, and it will rise sufficiently high to lift any fruit which may have a tendency to stick between the bars and to stop rolling down the incline. This lifting of the fruit causes it to continue its motion until it reaches a point where it can fall through, and it thus prevents the clogging of the machine, which would otherwise soon take place. In order to operate this bar and turn it from one side to the other, I have shown a shaft U, extending across in some convenient relation with the operating-gear N, and having mounted upon it the arms V, with the extensions W bent at right angles with the arms and at opposite ends, as shown in Fig. 4. The shaft U has a gear-wheel X fixed to it, and this wheel meshes with a pinion Y, which is fixed upon the shaft of the gear-wheel N, so that the shaft U will be rotated at any desired speed, depending upon the relative size of the gear and pinion by which it is operated. It will be seen that when this shaft is rotated one of the arms W will engage the crank-arm or swinging rod T and will throw it up to one side beneath the space between two of the adjacent bars A, and when the other arm rises beneath this rod it will turn up in the opposite direction and beneath the spaces upon the two bars on the other side, so that each one of these swinging rods serves to keep two of the spaces clear. When the fruit falls through the space between the bars, it is received upon a soft or padded surface Z, which inclines so as to deliver the fruit which first falls through into the box E and that which falls through next into the box F, while the fruit which falls off the end of the grading-rods, being too large to pass between them, is received upon a similar padded or flexible bottom of the chute G. The bottom of the hopper J is also made of similar soft or flexible material, the object of this construction being to prevent the fruit from being bruised and to protect it from injury.

Having thus described my invention, what I claim as new, and desire to secure by Letters Patent, is—

1. In a fruit-grader, the combination of the inclined bars upon which the fruit is received, the supporting-standards for said bars, the slotted transverse bar D, clamping-screws carried by the standards and passing through said slotted bar, whereby the inclined bars may be adjusted laterally, and the supplemental adjustable sides adapted to be moved outward and inward in conjunction with the bars, substantially as described.

2. In a fruit-grader, the combination of a main frame, a supplemental frame having sides adapted to be moved outward and inward, means for imparting a shaking motion to said supplemental frame, laterally-adjustable inclined bars upon which the fruit is received, crank-rods beneath the bars, and a cam adapted to operate the crank-rods, whereby they may be turned into the spaces between the bars to lift and move the fruit, substantially as described.

3. In a fruit-grader, the inclined diverging bars having their lower ends adapted to be adjusted laterally, in combination with the swinging crank-rods journaled beneath the bars, and the mechanism comprising the arms V, provided with extensions, whereby said rods may be turned upward into the spaces between the bars, so as to lift and move the fruit, substantially as described.

4. The fruit-grader comprising the longitudinally-inclined diverging bars, the hopper with adjusting-gates through which the fruit is delivered upon the upper ends of the bars, crank-shafts or swinging rods extending longitudinally beneath said bars, and a mechanism whereby the rods may be turned upward to one side or the other, so as to lift the fruit and prevent its sticking in the spaces between the bars, cams or eccentrics whereby a longitudinal shaking motion is applied to the frame-work in which the grading-bars are supported, a flexible, elastic, or padded surface or floor extending beneath the bars and having collecting boxes or receptacles into which the different grades of fruit may be received, substantially as described.

In witness whereof I have hereunto set my hand.

GEORGE W. THISSELL.

Witnesses:
 GEO. H. STRONG,
 S. H. NOURSE.